(12) United States Patent
Gopalan

(10) Patent No.: US 7,152,374 B2
(45) Date of Patent: Dec. 26, 2006

(54) COMPOSITE EXTRUSION FOR TRIM SEAL STRIP AND METHOD FOR FORMING SAME

(75) Inventor: Krishnamachari Gopalan, Troy, MI (US)

(73) Assignee: GenCorp Inc., Fairlawn, OH (US)

( * ) Notice: Subject to any disclaimer, the term of this patent is extended or adjusted under 35 U.S.C. 154(b) by 101 days.

(21) Appl. No.: 10/690,141

(22) Filed: Oct. 21, 2003

(65) Prior Publication Data

US 2005/0084629 A1    Apr. 21, 2005

(51) Int. Cl.
*E06B 3/00* (2006.01)
*E06B 7/16* (2006.01)
*F16J 15/10* (2006.01)

(52) U.S. Cl. ............... 49/506; 49/490.1; 277/650; 264/171.13; 428/122

(58) Field of Classification Search ............ 49/490.1, 49/471.1, 506; 277/650, 652, 654, 906, 921, 277/628; 264/171.13, 171.15, 171.24, 177.18, 264/167; 156/244.1; 428/122, 519, 515, 428/521, 500

See application file for complete search history.

(56) References Cited

U.S. PATENT DOCUMENTS

| | | | |
|---|---|---|---|
| 3,981,958 A * | 9/1976 | Nakashima et al. ........ 525/265 |
| 4,897,298 A * | 1/1990 | Otawa et al. ............... 428/122 |
| 4,962,148 A * | 10/1990 | Orikasa et al. ............. 524/504 |
| 5,183,613 A * | 2/1993 | Edwards ................ 264/177.18 |
| 5,380,785 A | 1/1995 | Ngoc et al. |
| 5,411,785 A | 5/1995 | Cook |
| 5,415,822 A | 5/1995 | Cook |
| 5,415,894 A * | 5/1995 | McGarry .................... 427/386 |
| 5,447,670 A * | 9/1995 | Ito et al. ..................... 264/167 |
| 5,635,274 A * | 6/1997 | Chihara et al. ............. 428/122 |
| 5,671,967 A * | 9/1997 | Gurganus et al. ......... 296/146.9 |
| 5,679,303 A * | 10/1997 | Hayashi et al. ............. 264/167 |
| 5,686,165 A | 11/1997 | Cook |
| 5,736,215 A * | 4/1998 | Buchholz et al. ....... 264/177.18 |
| 5,814,712 A * | 9/1998 | Gallucci et al. ............ 525/436 |
| 6,370,824 B1* | 4/2002 | Keeney et al. ............. 49/490.1 |
| 6,422,571 B1* | 7/2002 | Keeney et al. ............. 277/906 |
| 6,660,360 B1* | 12/2003 | Mertzel et al. ............ 49/475.1 |
| 6,733,846 B1* | 5/2004 | Ruepping .................... 427/508 |
| 6,849,310 B1* | 2/2005 | Willett ....................... 49/475.1 |

FOREIGN PATENT DOCUMENTS

GB      EPA178064 A2 *  4/1986

OTHER PUBLICATIONS

Nigen, et al., *Soft Feel Olefin Interiors with A Touch of Acrylate*, Goodyear Chemicals Europe, TPO 1998 (pp. 1-9), no month available.

Soft Feel Olefin Interiors with a Touch of Acrylate, Bernard Nigen and Pat Tandon, Goodyear Chemicals Europe, pp. 1-9; 1998, no month available.

* cited by examiner

*Primary Examiner*—Hugh B. Thompson, II
(74) *Attorney, Agent, or Firm*—Brinks Hofer Gilson & Lione

(57) ABSTRACT

A composite extrusion for an automotive seal strip is formed of an extruded body, and a veneer extruded onto the body. The extruded body is composed of ethylene-propylene diene rubber compound. The veneer is composed of a polymer blend that includes the reaction product of an acrylate polymer and a glycidyl acrylate polymer. The reaction of the acrylate polymer and the glycidyl acrylate polymer improves adhesion and also provides a barrier to inhibit migration of vulcanizing agents from the ethylene-propylene diene rubber body into the veneer that would otherwise cause discoloration during use.

16 Claims, 1 Drawing Sheet

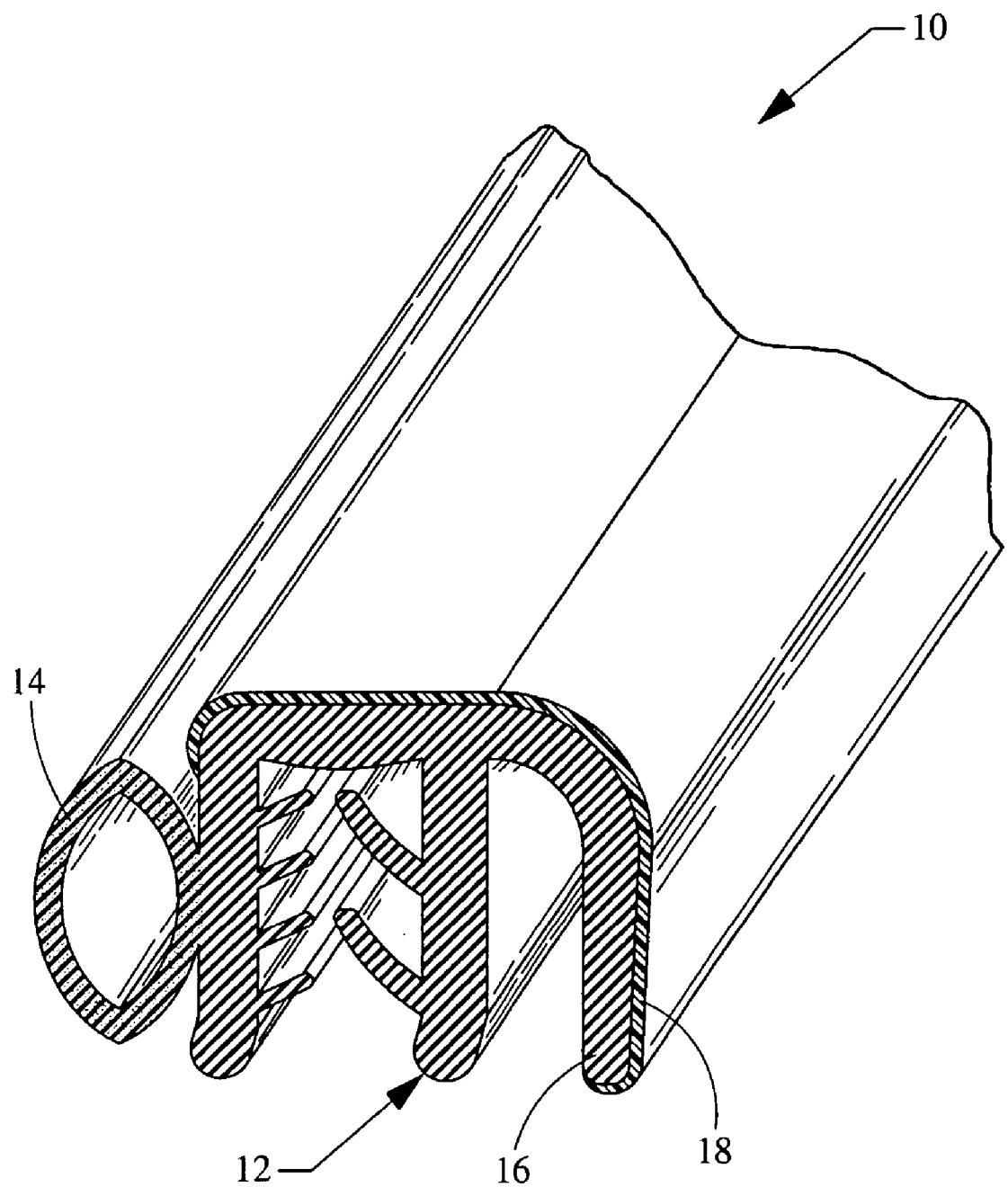

COMPOSITE EXTRUSION FOR TRIM SEAL STRIP AND METHOD FOR FORMING SAME

TECHNICAL FIELD OF THE INVENTION

This invention relates to a trim seal strip formed of a composite extrusion. More particularly, this invention relates to such trim strip that comprises an extruded base composed of ethylene-propylene diene rubber compound and a co-extruded veneer composed of a polymer blend that includes a reaction product of an acrylate polymer and a glycidyl acrylate polymer.

BACKGROUND OF THE INVENTION

It is common practice in automotive vehicles and elsewhere to use a trim seal strip about a door or window. For example, in automotive vehicles, a primary door trim seal strip is attached to a body panel about an opening for a door and seals against the door when closed. The trim seal strip is formed of an extruded polymeric material. A preferred material is composed of ethylene-propylene diene rubber compound, commonly referred to as a EPDM. The trim strip is formed by extruding an unvulcanized blend that contains an EPDM compound with fillers, plasticizers and a vulcanizing agent, and curing the extrusion to crosslink the polymer and form the product rubber compound. The material includes carbon black filler that provides a dark black appearance and reinforcement. On visible surfaces of the trim strip, it is desired to apply a coating having a non-black color that coordinates with surrounding colors to provide an aesthetically pleasing appearance. For example, for an automotive primary door trim strip, an interior surface may be coated to coordinate with a color of a headliner in the vehicle. A suitable coating has been formed of colored EPDM rubber, or colored thermoplastic material. Such coatings are relatively soft and susceptible to scratching and marring. EPDM veneers are difficult to color match. On the other hand, thermoplastic layers tend to have poor adhesion to the EPDM base. Still further, during use, residual zinc sulfur agents from the vulcanizing process tend to leach from the EPDM base into the thermoplastic layer and cause discoloration.

Therefore, a need exists for a trim strip for automotive applications and the like that is formed of an extruded EPDM base and includes a veneer having an aesthetically pleasing color and formed of a material having enhanced mar resistance and improved adhesion, and further providing a barrier to inhibit migration of residual agents from the base that would otherwise result in staining of the veneer.

SUMMARY OF THE INVENTION

In accordance with this invention, a composite extrusion comprises a body composed of ethylene-propylene diene rubber compound. A veneer is extruded onto the body and is composed of a polymer blend that includes an acrylate polymer and a glycidyl acrylate polymer, preferably an ethylene glycidyl acrylate polymer. Upon curing, the glycidyl acrylate polymer reacts with the acrylate polymer and serves as a compatibilizer to enhance adhesion of the veneer to the base. Also, it is believed that the reaction product forms an interfacial barrier to inhibit migration of stain-inducing residual agents from the base into the veneer. As a result, the veneer may be readily formulated with a coloring agent to provide a durable trim that is aesthetically pleasing and well suited for use in automotive and like applications.

BRIEF DESCRIPTION OF THE DRAWINGS

This invention will be further described with reference to the accompanying drawings wherein:

FIG. 1 is a cross-section of an extruded trim in accordance with a preferred embodiment of this invention.

DETAILED DESCRIPTION OF THE INVENTION

In accordance with a preferred embodiment, referring to the Fig., a primary door trim seal strip 10 is adapted to fit about a door opening of an automotive vehicle to form a seal against a door. It will be appreciated that strip 10 depicted in FIG. 1 is a conventional scorpio-type design and is by way of example only. The particular design of the trim seal strip depends upon the nature of the application, the design of the vehicle, and other factors. It is an advantage that this invention may be readily adapted for forming seals of other designs and for other applications, including glass seals.

Strip 10 comprises an extruded main body 12 that is adapted for installation in a body panel about the door opening, and a flexible sealing ring 14 co-extruded with body 12 and adapted to engage the vehicle door for forming a seal thereagainst. Body 12 may include a metallic or polymeric carrier (not shown). During manufacture, main body 12 is extruded about the carrier and cured, whereupon the carrier becomes embedded therein. Body 12 also includes a flange 16 that overlies a border of a headliner when installed in a vehicle to cover a seam between the headliner and the body panel. In accordance with this invention, visible surfaces of main body 12 are covered by a co-extruded veneer 18. Veneer 18 preferably contains coloring agents to coordinate with the adjacent headliner and provide an aesthetic appearance.

Main body 12 is formed by extrusion and is composed of a dense ethylene-propylene diene rubber compound, referred to as EPDM. EPDM is a thermoset material that is characterized by a polymeric backbone derived from ethylene and propylene monomers and includes a side chain formed of a diene termonomer. A preferred diene termonomer is ethylidene norbornene. Alternately, dicyclopentadiene is a suitable termonomer. The diene precursor is formulated with a sulfur-containing vulcanizing agent, which is commonly an organic zinc sulfur complex. The formulation also preferably includes antioxidants and ultraviolet light absorbers, as well as a carbon black filler that reinforces the product and imparts a black coloration. Thereafter, during curing, the sulfur-containing agent reacts with the diene groups to cross-link the polymer and form the product thermoset material. Sealing ring 14 is composed of a sponge EPDM compound similar to the dense material of boy 12 but including a foaming agent that enhances flexibility of the product compound.

In accordance with this invention, veneer 18 is formed of a polymeric blend that contains an acrylate polymer and an ethylene glycidyl polymer. Preferably, the blend is composed predominantly of polyolefin elastomer (m-POE), high density polyethylene (HDPE) thermoplastic polyolefin rubber (TPO) or other suitable polyolefinic compound. By way of a preferred example, a suitable blend was obtained containing about 70 weight percent m-POE, 20 weight percent of acrylate polymer and 10 weight percent ethylene glycidyl polymer. The m-POE is commercially available from DuPont Dow Elastomers under the trade designation Engage 8100. The acrylate polymer is an acrylate-based terpolymer commercially available from Goodyear Chemicals Europe under the trade designation Sunigum P7395. The preferred ethylene glycidyl acrylate is ethylene methyl acrylate glycidyl methacrylate, commercially available from Elf-Atochem under the trade designation Lotader AX8900 and is referred to as EMA-GMA. The blend was obtained as pellets, melted and extruded as a layer onto the surface of a cured EPDM body at a temperature of about 300° F. The main body was formed by extruding and curing EPDM precursor having diene groups derived from ethylidene norbornene termonomer. The composite was heated at a temperature between about 400° F. and 500° F. to react the an acrylate components to form the product veneer. In comparison to veneers applied to EPDM bodies and formed of polyolefin compounds without the acrylate additive, the veneer in accordance with this invention exhibited improved adhesion and enhanced mar resistance. In addition, the veneer exhibited improved weatherability, and, in particular, reduced discoloration in the presence of the EPDM material.

In the aforementioned example, the veneer compound was applied to an EPDM-base body that was vulcanized. In commercial production, the veneer compound may be co-extruded onto the EPDM base prior to curing, and the two materials concurrently cured by heating to a temperature between about 450° F. and 650° F., preferably about 500° F. Also, additives are preferably added to the blend to enhance the properties of the product veneer. In particular, it is desired to add coloring agent, typically in an amount between about 0.05 and 3 weight percent, to produce a desired color for the veneer. Also, materials adapted for commercial use preferably include, antioxidants and ultraviolet light absorbers, and optionally may contain plasticizers in an amount up to about 20 weight percent.

While not limited to any particular theory, it is believed that the reaction of the acrylate-based polymer and the ethylene glycidyl acrylate polymer in the veneer produces a product that exhibits an affinity for the EPDM base to form an interfacial compatabilized polar barrier film. Formation of the polar barrier film may be enhanced as a result of reaction between unreacted surface diene groups of the EPDM base and ethylene glycidyl acrylate polymer in the veneer compound, particularly when the veneer blend is applied to pre-vulcanized EPDM material, and the materials are concurrently cured. It is pointed out that the EPDM is commonly formulated to contain organic zinc sulfur complexes in excess of stociometric quantities required for curing. For polyolefin veneers applied to EPDM base without the acrylate additives in accordance with this invention, the zinc sulfur complexes tend to migrate from the EPDM base into the polyolefin layer and, for layers containing a coloring agent, tend to produce localized discoloration. In contrast, the affinity of the polar zinc sulfur complex for the polar reaction product between the acrylate-based polymer and the ethylene glycidyl acrylate compound in accordance with this invention inhibits further migration of the complex to the surface and thus inhibits discoloration at the surface that would otherwise be readily visible during weathering tests. Thus, the addition of the ethylene glycidyl acrylate polymer serves both as a compatilizer to promote adhesion of the acrylate-containing polyolefin blend to the EPDM surface and also promotes weathering resistance. Moreover, the addition of the acrylate polymer promotes hardness within the polyolefin layer and results with improved mar resistance.

While this invention has been described in terms of certain embodiments thereof, it is not intended to be so limited, but rather only to the extent set forth in the claims that follow.

The invention claimed is:

1. A method for forming a composite extrusion for a trim seal strip comprising:
   extruding a body composed of ethylene-propylene diene rubber compound and having a surface;
   extruding a layer onto said surface composed of a polymer blend comprising an acrylate polymer and a glycidyl acrylate polymer; and
   curing said layer to form a veneer bonded to the body, wherein said curing includes reacting said acrylate polymer and said glycidyl acrylate polymer and the acrylate polymer and the glycidyl acrylate polymer form a reaction product having an affinity for ethylene-propylene diene rubber compound and forming an interfacial barrier effective to inhibit migration of polar agents from said body into said veneer.

2. The method of claim 1 wherein said surface comprises diene groups and wherein said curing includes reacting a portion of said glycidyl acrylate polymer and said diene groups.

3. The method of claim 1 wherein the layer contains a coloring agent.

4. The method of claim 1 wherein the glycidyl acrylate polymer is an ethylene glycidyl acrylate polymer.

5. The method of claim 1 wherein the glycidyl acrylate polymer is ethylene methyl acrylate glycidyl methacrylate terpolymer.

6. A method for forming a composite extrusion comprising:
   extruding a body having an external surface and composed of an ethylene-propylene diene precursor that includes diene groups and a vulcanizing agent;
   extruding onto said external surface of said body a veneer composed predominantly of a polyolefin compound and comprising an acrylate-based polymer and an ethylene glycidyl acrylate polymer; and
   curing said body and said veneer to vulcanize the ethylene-propylene diene precursor to form ethylene-propylene diene rubber compound, and concurrently to react said acrylate-based polymer and said ethylene glycidyl acrylate compound in said veneer, wherein the reaction between said acrylate-based polymer and said ethylene glycidyl acrylate polymer forms a reaction product that provides a compatabilized polar interfacial barrier adjacent said ethylene-propylene diene rubber compound effective to inhibit migration of residual vulcanizing agents into the veneer.

7. The method of claim 6 wherein a portion of said ethylene glycidyl acrylate polymer reacts with diene groups at a surface of said body to enhance adhesion of the veneer to the body.

8. The method of claim 6 wherein the glycidyl acrylate polymer is ethylene methyl acrylate glycidyl methacrylate terpolymer.

9. The method of claim 6 wherein the veneer comprises a coloring agent.

10. The method of claim 6 wherein the veneer is composed predominantly of a thermoplastic polyolefin.

11. The method of claim 10 wherein the thermoplastic polyolefin is a polyolefin elastomer.

12. A composite extrusion adapted for an automotive trim seal, said composite extrusion comprising:
   a body having an external surface and composed of ethylene-propylene diene rubber compound; and
   a co-extruded veneer applied to the external surface of the body and composed of a blend comprising predominantly polyolefinic compound and containing a reaction product of an acrylate polymer and an ethylene glycidyl acrylate polymer;

wherein the ethylene-propylene diene rubber compound contains a residual vulcanizing agent, and said reaction product provides a barrier effective to inhibit migration of the residual vulcanizing agent into the veneer.

13. The composite extrusion of claim 12 wherein the composite extrusion comprises an interface between the body and the veneer, and wherein the interface comprises a reaction product of a diene group of said ethylene-propylene diene rubber compound and said glycidyl acrylate polymer.

14. The composite extrusion of claim 12 wherein the veneer contains a coloring agent.

15. The composite extrusion of claim 12 wherein the ethylene glycidyl acrylate polymer is ethylene methyl acrylate glycidyl methacrylate terpolymer.

16. The composite extrusion of claim 12 wherein the polyolefin compound is a polyolefin elastomer.

* * * * *